United States Patent
Kim (10) Patent No.: US 7,555,072 B2
(45) Date of Patent: Jun. 30, 2009

(54) METHOD AND CIRCUIT FOR DETECTING GUARD INTERVALS IN OFDM COMMUNICATION SYSTEMS

(75) Inventor: Dong-Kyu Kim, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 614 days.

(21) Appl. No.: 11/300,099

(22) Filed: Dec. 14, 2005

(65) Prior Publication Data

US 2006/0146947 A1 Jul. 6, 2006

(30) Foreign Application Priority Data

Jan. 3, 2005 (KR) .............. 10-2005-0000273

(51) Int. Cl.
*H03D 1/00* (2006.01)
(52) U.S. Cl. .............. 375/343; 375/260; 375/354
(58) Field of Classification Search ......... 370/335; 375/260, 343, 354; 455/562.1
See application file for complete search history.

(56) References Cited

U.S. PATENT DOCUMENTS

| | | | | |
|---|---|---|---|---|
| 5,881,057 A | * | 3/1999 | Komatsu | 370/335 |
| 6,438,183 B1 | * | 8/2002 | Taura et al. | 375/343 |
| 6,618,452 B1 | * | 9/2003 | Huber et al. | 375/343 |
| 2002/0150181 A1 | * | 10/2002 | Sayeed | 375/343 |
| 2004/0223554 A1 | * | 11/2004 | Cha | 375/260 |
| 2005/0271174 A1 | * | 12/2005 | DiRenzo et al. | 375/354 |
| 2007/0066362 A1 | * | 3/2007 | Ma et al. | 455/562.1 |

FOREIGN PATENT DOCUMENTS

| | | |
|---|---|---|
| JP | 2002-232389 | 8/2002 |
| JP | 2003-152670 | 5/2003 |
| KR | 1999-0027847 | 4/1999 |
| KR | 1020030006884 | 1/2003 |
| KR | 1020040009938 | 1/2004 |

* cited by examiner

*Primary Examiner*—Sudhanshu C Pathak
(74) *Attorney, Agent, or Firm*—F. Chau & Associates, LLC (57) ABSTRACT

A circuit for detecting a guard interval in an orthogonal frequency division multiplication (OFDM) communication system, using two successive autocorrelation calculations for a received sample train. The circuit determines a guard interval by calculating the maximum correlation value first autocorrelation calculation step (delaying an OFDM signal by the length of valid data N, the useful data duration); and a second autocorrelation calculation step (delaying the OFDM signal by a guard interval detection period (N+G1), the sum of the valid data length (N) and the minimum guard interval (GI)). Performing two autocorrelation calculation steps provides improved detection of the guard interval, being free from noises and distortions and producing the maximum correlation value and position more distinctly.

25 Claims, 5 Drawing Sheets

Fig. 1

(PRIOR ART)

METHOD AND CIRCUIT FOR DETECTING GUARD INTERVALS IN OFDM COMMUNICATION SYSTEMS

CROSS-REFERENCE TO RELATED APPLICATIONS

This U.S. non-provisional patent application claims priority under 35 U.S.C. § 119 of Korean Patent Application 2005-00273 filed on Jan. 3, 2005, the entirety of which is hereby incorporated by reference.

BACKGROUND

1. Field of the Invention

The present invention relates to orthogonal frequency division multiplication (OFDM) data transmission systems, and more particularly to methods and circuits for detecting and deciding the length of guard intervals included in received signals, and receivers including the circuits.

2. Description of the Related Art

OFDM systems are widely used and regarded as being advantageous for high-frequency data transmission through wired and wireless communication channels such digital audio broadcasts, digital television (DTV), and wireless local area networks (WLAN). OFDM is already part of WLAN, DVB (Digital Video Broadcast), and BWA (broadband wireless access) standards, and is a strong candidate for some of the fourth generation (4G) wireless telephone technologies. While a conventional (non-OFDM) communication system performs high-frequency data transmission using a single carrier (frequency), OFDM systems use multiple carriers (a multi-carrier scheme) having mutual orthogonality, so that it is possible to reduce the data rate on each carrier (e.g., by increasing the symbol period of each carrier wave) by the number of sub-carrier waves while retaining current data transmission speed, and to mitigate symbol interference due to the multi-path phenomena.

Synchronization for demodulating OFDM signals needs symbol timing sync, carrier wave sync, and sampling frequency sync. Correct synchronization is an important factor to determine the reliability of the system and the efficiency of data transmission. Since the OFDM scheme demodulates a received signal (including a succession of OFDM symbols) using a form of fast Fourier transform (FFT), it is necessary to complete a correct symbol timing sync operation to define a (symbol) period to operate the FFT.

Figure 1:
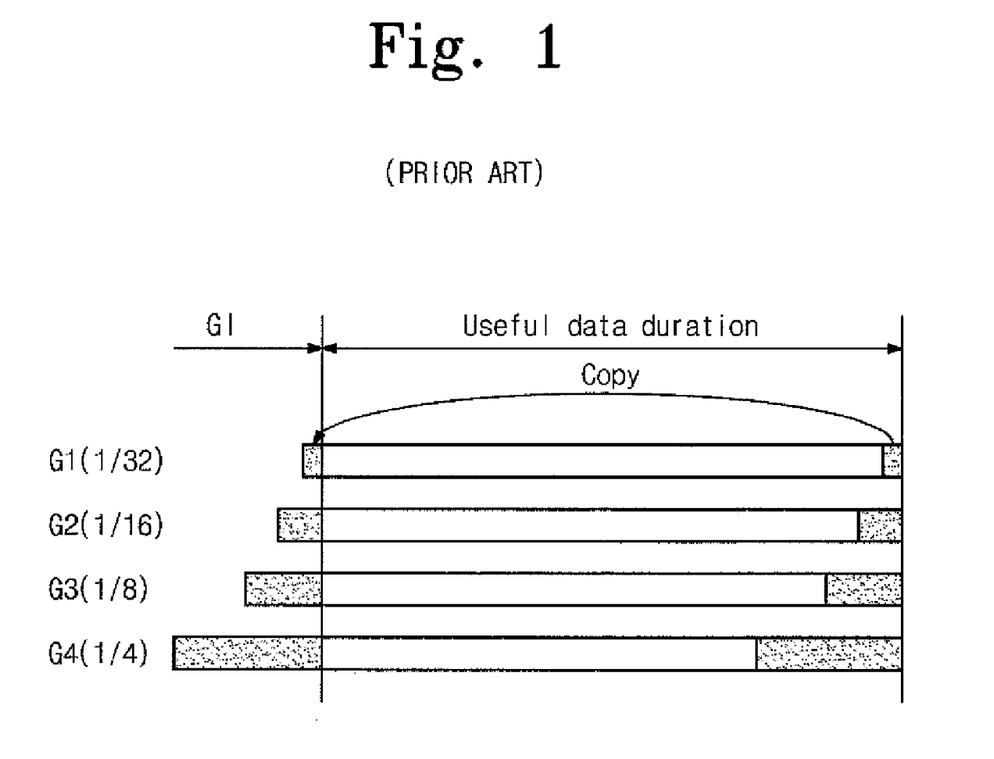
FIG. 1 is a schematic diagram illustrating the structure of OFDM symbol and the types of guard intervals.

FIG. 1 shows the structure of an OFDM symbol used in an OFDM system. The "OFDM symbol period" is composed of the useful data duration (N samples) not including the guard interval duration (e.g., G1). Useful information (e.g., WLAN transmission data) is positioned within the useful data duration (N samples), and the guard interval contains a copy of a portion of the useful data that is used as a cyclic prefix for preventing symbol interference caused in the environment of transmission.

Cyclic prefix is a crucial feature of OFDM used to combat the inter-symbol-interference (ISI) and inter-channel-interference (ICI) introduced by the multi-path channel through which the signal is propagated. The basic idea is to replicate part of the OFDM time-domain waveform from the back to the front to create a guard interval. The duration of the guard interval (the guard interval duration) $T_g$ should be longer than the worst-case delay spread of the target multi-path environment. At the receiver side, data in the guard interval (where symbols are expected to interfere with each other by multi-path) is ignored, and the rest of the duration is demodulated by OFDM. The inserted waveform is called the "Guard Interval", and its length is called "Guard Interval Duration".

The data of the guard interval generally copies the (data) value of a portion of the symbol (in the useful data duration). The length of the guard interval (guard interval duration) is varied by the transmitter in accordance with the length of (expected) symbol interference (SI) generated in the environment of transmission. In order to absorb multi-path interference, the copied waveform of the OFDM symbols is inserted (in the guard interval) to effectively separate consecutive OFDM symbols by a length (guard interval) based on the expected delay of the multi-path interference. The effect of the inter-symbol interference can be minimized to assure reliable communication if the guard interval is long enough. Hereinafter, it is assumed that the useful data duration has the length of N samples and the guard interval has the length of G1, G2, G3, or G4 samples. The length of the guard interval is generally N/32(G1), N/16(G2), N/8(G3), and N/4(G4) ( i.e., a selected fraction of the length of the symbol, the useful data duration, N).

In the standard of European digital television broadcasting system, there are 2048 samples in a useful data period (one symbol), thus N=2048. Thus, it can be seen that G1=2048/32=64 samples, G2=120 samples, G3=256 samples, and G4=512 samples. The guard interval data is defined by copying a part of the useful data (symbol) and thus has a large correlation with the copied portion of the delayed useful data.

Figure 2:
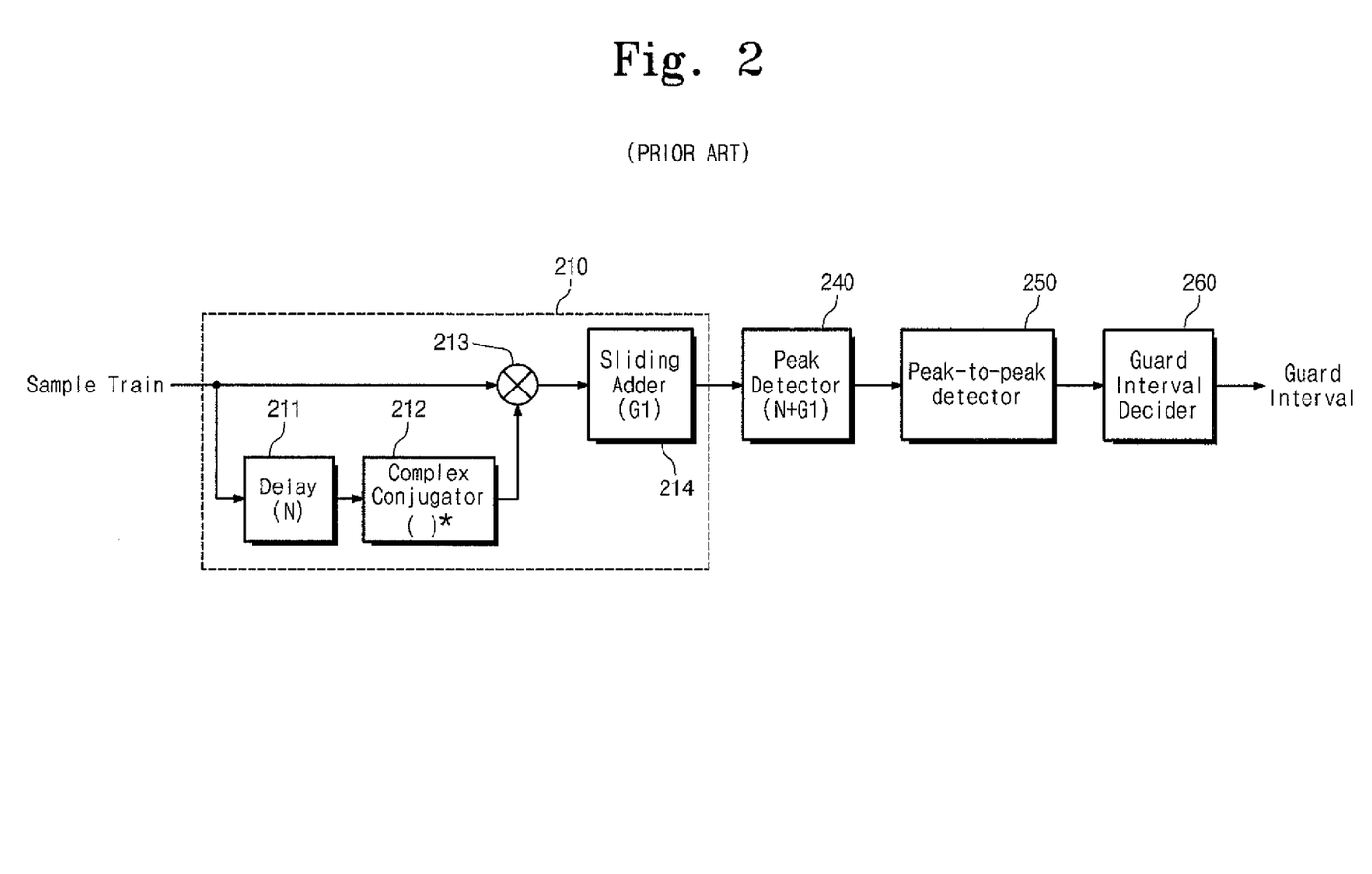
FIG. 2 is a block diagram of a conventional guard interval detection circuit.

FIG. 2 is a block diagram of a conventional guard interval detection circuit. The guard interval detection circuit includes a correlator (autocorrelator) 210, a peak detector 240, a peak-to-peak interval detector 250, and a guard interval decider 260.

The correlator 210 includes a delay circuit delaying a received signal by the useful data interval size (N samples), a complex conjugating circuit 212 converting a delayed complex signal into a complex conjugate signal, a multiplier 213 performing a complex-multiplication operation on the delayed complex signals, and a sliding adder 249 adding the multiplied complex sample trains output from the multiplier within a window having the length of the minimum guard interval G1. With this construction, the conventional guard interval detection circuit obtains correlation (autocorrelation) values using the complex multiplication of received sampled data trains with the complex conjugate of N-sample delayed values of the received sampled data trains.

The delay circuit 211 is a kind of memory (e.g., shift register) delaying a sample train by a predetermined time (e.g., by N samples). The delay time is variable based on symbol length (N) for various OFDM systems.

The complex conjugator 212 converts the delayed received complex sample train into its conjugate complex value train.

The multiplier 213 performs multiplication of the non-delayed received sample train and its delayed complex conjugate train.

The sliding adder 214 adds (and accumulates) the product of the multiplication (of the received sample train and its delayed complex conjugate sample train) output from the multiplier 213, within the window having the width of the shortest guard interval length (G1), and stores the result (sums) in a memory that shifts (delays) the operation by one sample interval. If the non-delayed received sample train and the delayed complex conjugate of the received sample train are the same (high correlation), a complex sum train having a relatively large absolute value is generated from the sliding adder indicating a high correlation. Conversely, the multiplication of completely non-correlative sample trains generates a relatively small complex value.

The output of the sliding adder 214 is defined in Equation 1 as follows:

$$R_n = \sum_{i=0}^{Gl-1} y_{n-i} y^*_{n-N-i} \quad \text{[Equation 1]}$$

In Equation 1, the parameter y denotes a complex input sample, and the parameter R is a result of sliding-addition of the products (of multiplication of the non-delayed input sample by the complex conjugate of the input signal delayed by N samples) within a window having the minimum guard interval length (GI=G1). The parameter n represents an order of input samples. As the result (sum) of the sliding addition is also represented as a complex sample train, it is difficult to detect the sample size by the conventional guard interval detection circuit.

In the convention guard interval detection circuit, the length of the current guard intervals is obtained, after taking the absolute value of Rn and detecting the location of the maximum value, from operating the detected point throughout several OFDM symbols and utilizing a displacement value of the maximum value location. The guard interval's length is estimated by detecting a starting point accompanying a significant amplitude supposed to correspond to a guard interval with large correlation.

The peak detector 240 stores data, obtained from the correlator 210 in a sliding window (data frame), (in a memory) and identifies the largest stored value as a peak value.

The peak-to-peak interval detector 250 finds the maximum value position stored in the peak detector 240 and stores the detected position value in a memory.

The guard interval decider 260 detects the guard interval length by using displacement values of the maximum value position stored in the peak-to-peak interval detector 250.

Thus, the guard interval length is determined from finding a peak point having the largest correlation value by performing a self-correlation (autocorrelation) operation (correlating the input sample train with a copy of the input sample train delayed by the useful data duration of the input sample train). This utilizes the characteristic of the input signal train that the guard interval's data is set by copying a portion of the useful data and thus has large correlation with the delayed input signal train (itself, delayed).

In the conventional guard interval detector configuration of FIG. 2, detecting the guard interval length using one autocorrelation calculation and the maximum value of the result of the autocorrelation calculation, it has been difficult to assure the performance of position estimation for the maximum value, due to noises and distortions normally existing in the transmission channel. Further, as the interval including the maximum value is typically not a distinct sharp point but rather a lengthened time period (planar, platau) during the correlation calculation, it has been insufficient to estimate a guard interval length correctly. Therefore, it is necessary to increase the performance of a guard interval length estimation in an OFDM system using a guard interval affected by a channel condition, and to enhance the reliability of a timing sync in a receiver using correct detection of the guard interval.

SUMMARY OF THE INVENTION

Exemplary embodiments of the present invention provide a method and an apparatus for correctly and reliably detecting a guard interval by including a correlator operable with a regularizing step in guard interval detecting circuit.

An aspect of the invention is a guard interval detection circuit of an orthogonal frequency division multiplication (OFDM) system, comprising: a first (auto)correlator (delaying a received sample train by a first time and obtaining a correlation value between the received sample train and the delayed sample train); and a second (auto)correlator (delaying the output of the first (auto)correlator by a second time and obtaining a correlation value between the output of the first correlator and the delayed output of the first correlator). The guard interval detection circuit may further comprise a detector finding the maximum value of the output of the second (auto)correlator and a point (e.g., precise position) of the maximum value and deciding therefrom the type of the current guard interval.

A "correlator" herein may have the same architecture as the (autocorrelator) circuit 210 aforementioned in operation and structure, but its input, output, and delay is variable.

In a preferred embodiment, the first (auto)correlator performs conventionally in the same manner as defined in the Equation 1 (including a step of complex multiplication with an input sample train and a delayed complex conjugate of the input sample train delayed by one symbol length N, and a step of sliding addition within a window having the length of the minimum guard interval). This operation is carried out in the same as defined in the Equation 1. The output of such a conventional autocorrelator may then be regularized by multiplication with the output of a regularizer, which may function to filter Additive White Gaussian Noise (AWGN).

The regularizer obtains the power value for the input complex sample train, performs sliding addition within a window having the length of the minimum guard interval, and inverts the sum and outputs the result as a fraction between 0 and 1.

The second (auto)correlator performs a self-correlation (autocorrelation) calculation with the regularized sample train and the regularized sample train delayed by the guard interval detection period. The guard interval detection period is the sum of the OFDM symbol period (useful data duration, N samples) and the minimum guard interval duration (G1).

Next, power value is obtained by a squaring circuit generating the magnitude of the output of the second (auto)correlator.

With the exemplary configuration described above, the two steps of (auto)correlation calculation effectively removes the influence of less correlative AWGN (Additive zero-mean (White) Gaussian Noise) or distortions, and obtains a more distinct peak pattern for precise guard interval detection.

BRIEF DESCRIPTION OF THE DRAWINGS

The accompanying drawings are included to provide a further understanding of the invention, and are incorporated in and constitute a part of this specification. The drawings illustrate exemplary embodiments of the present invention and, together with the description, serve to explain principles of the present invention. The present invention may, however, be embodied in different forms and should not be construed as limited to the embodiments set forth herein. Rather, these exemplary embodiments are provided so that this disclosure will be thorough and complete, and will fully convey the scope of the invention defined in the claims to those skilled in the art. Like numerals refer to like elements throughout the specification. In the drawings:

In FIG. 5, the numeric labels (e.g., 64, 128, 192, 384, 448, 576, 896, 1344, and 2048) are dimensions (measured in sampling period T) and not distinct element reference numerals.

DETAILED DESCRIPTION OF PREFERRED EMBODIMENTS

Figure 3:
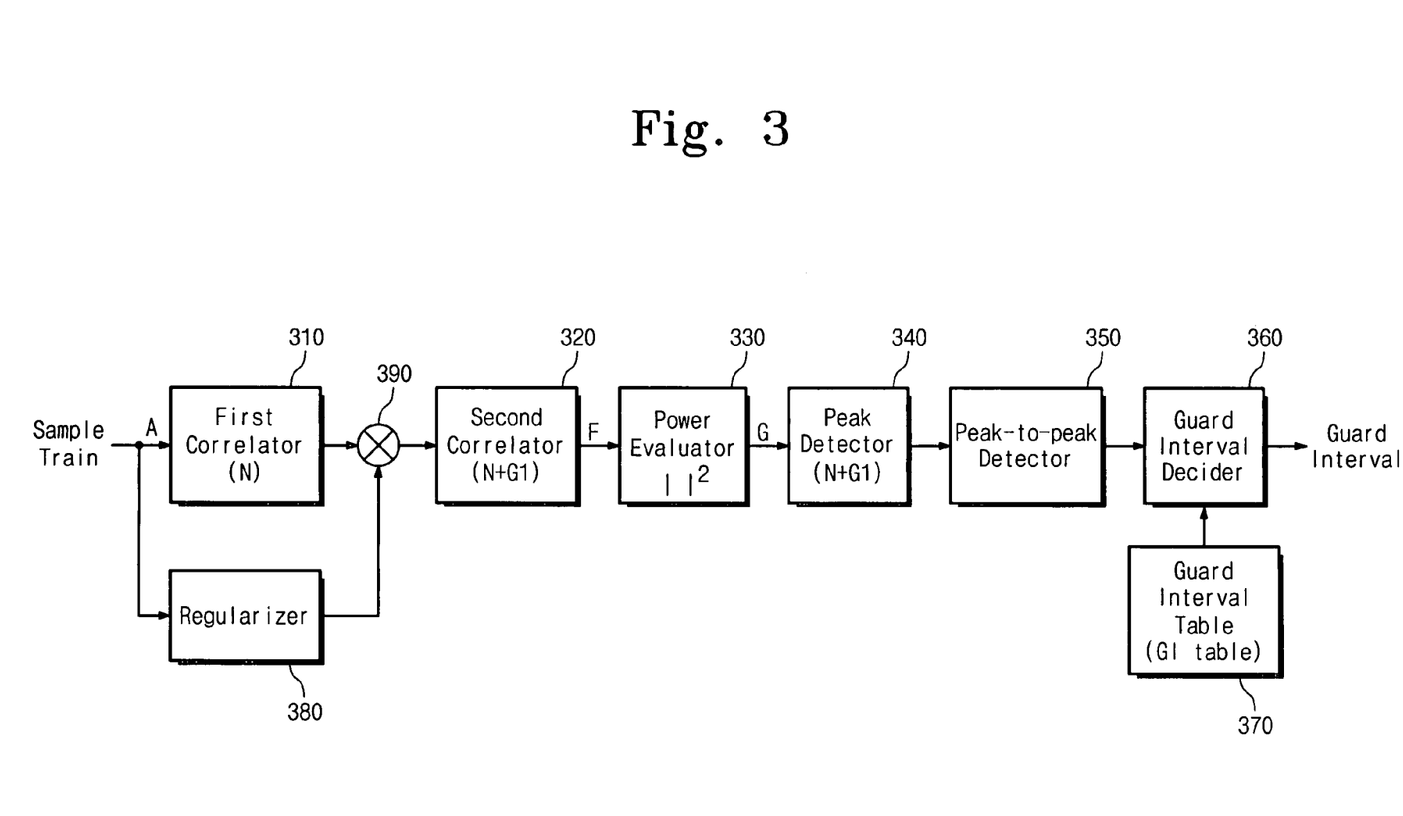
FIG. 3 is a block diagram of a guard interval detection circuit in accordance with an embodiment of the invention.

FIG. 3 is a functional block diagram of a guard interval detection circuit in accordance with an embodiment of the invention. The guard interval detection circuit is comprised of a first (auto)correlator 310, a regularizer 380, a second (auto) correlator 320, a power evaluator 330, a peak detector 340 (e.g., the same as conventional peak detector 240), a peak-to-peak detector 350 (e.g., the same as conventional peak-to-peak detector 250), a guard interval decider 360, and a guard interval table 370.

The first (auto)correlator 310 performs a conventional correlation step (including the substeps of: complex multiplication of an input sample train and a the complex conjugate of a delayed copy of the input sample train (delayed by one symbol length, N samples), and the substep of performing sliding addition within a window having the length of the minimum guard interval (G1). This correlation operation is carried out in the same manner as defined in the former Equation 1.

The regularizer 380 obtains and squares the absolute value of the input sample train, representing the result as a fraction. The operation and structure of the regularizer 380 will be further described in conjunction with FIG. 4 below.

The multiplier 390 makes the signal processing operation easier by regularizing sample trains to a magnitude of between 0~1 as a result of the correlation calculation (by multiplying the outputs of the first correlator 310 and regularizer 380). The resultant value output from the multiplier 390 is defined by Equation 2.

$$C_n = \overset{G1-1}{\underset{i=0}{Q}} \frac{y_{n-i} y^*_{n-N-i}}{|y_{n-i}|^2} \quad \text{[Equation 2]}$$

In equation 2, the parameter $C_n$ is the value obtained from regularizing complex sample trains of $R_n$.

The second correlator 320 operates in the same manner as the first correlator 310 except that the delay is the sum of the useful data duration (N) and the minimum guard interval (G1).

The power evaluator 330 squares the absolute value of the output sample train of the second correlator 320, and squaring the absolute value results in a train of real numbers.

The peak detector 340 inputs the real-number train from the power evaluator 330, and stores the maximum peak values every N+G1 time and stores the peak times (times at which a maximum peak value is present).

The peak-to-peak detector 350 calculates intervals from the starting points a periodic reference time of N+G1 to the peak points (peak times, from detected peak points), which are stored by peak detector 340, every N+G1 time.

The guard interval decider 360 outputs a signal indicating the type of the guard interval based on comparing differential values of the time intervals between every reference time N+G1 and the peak points, which are output from the peak-to-peak detector, with the index of the guard interval table 370.

The guard interval table 370 corresponds to a memory storing the (expected) time intervals of the peak times every guard interval detection period. The stored time interval to be generated every symbol will be referred with Table 1 described later.

Figure 4:
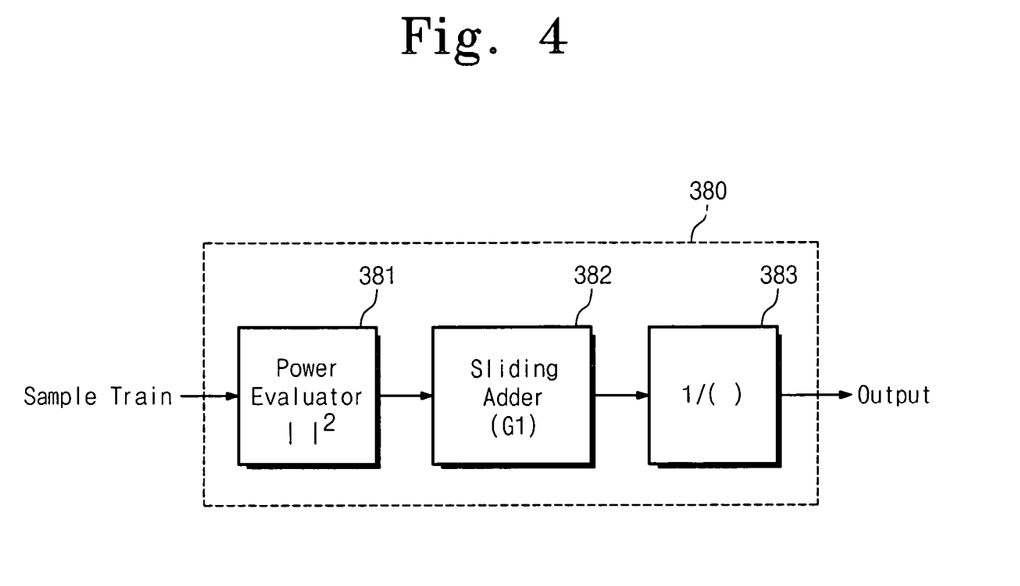
FIG. 4 is a block diagram of the regularizer 380 shown in FIG. 3.

The guard interval detection circuit according to an exemplary embodiment of the invention performs the conventional self-correlation (autocorrelation) calculation by way of conjugate complex multiplication with an original sample train and a delayed sample train (delayed by the useful data duration (N samples)) in the first correlator 310, and regularizes the result of the conventional correlation calculation. And then, the regularized correlation result is put into the second correlator 320 which performs a secondary correlation calculation with a delay of N+G1 (the sum of the useful data duration and the minimum guard interval). The secondary correlation result is used by the power evaluator 330 to output the real-number train of power values. The real-number train of power values is used in the peak-to-peak detector 350 for detecting the maximum (peak) points in the peak detector 340, and for obtaining the intervals from detection starting points of guard intervals (by calculating intervals between the maximum (peak) points within every (guard interval) detection period N+G1. The guard interval decider 360 outputs information of the guard interval based on identifying an indexing value of the guard interval length table 30, which matches with the resultant value of the peak-to-peak detector 350, as the corresponding guard interval, FIG. 4 is a block diagram of the regularizer 380 shown in FIG. 3. Referring to FIG. 4, the regularizer 380 is comprised of a power evaluator 381 (that obtains a real-number power value for each input sample), a sliding adder 382 (performing addition with each sample within the window of the minimum guard interval G1), and a fraction operating circuit (divider) 383 (dividing the sum of the output power values from the sliding adder 382 by the complex sample train output from the first correlator 310).

Figure 5:
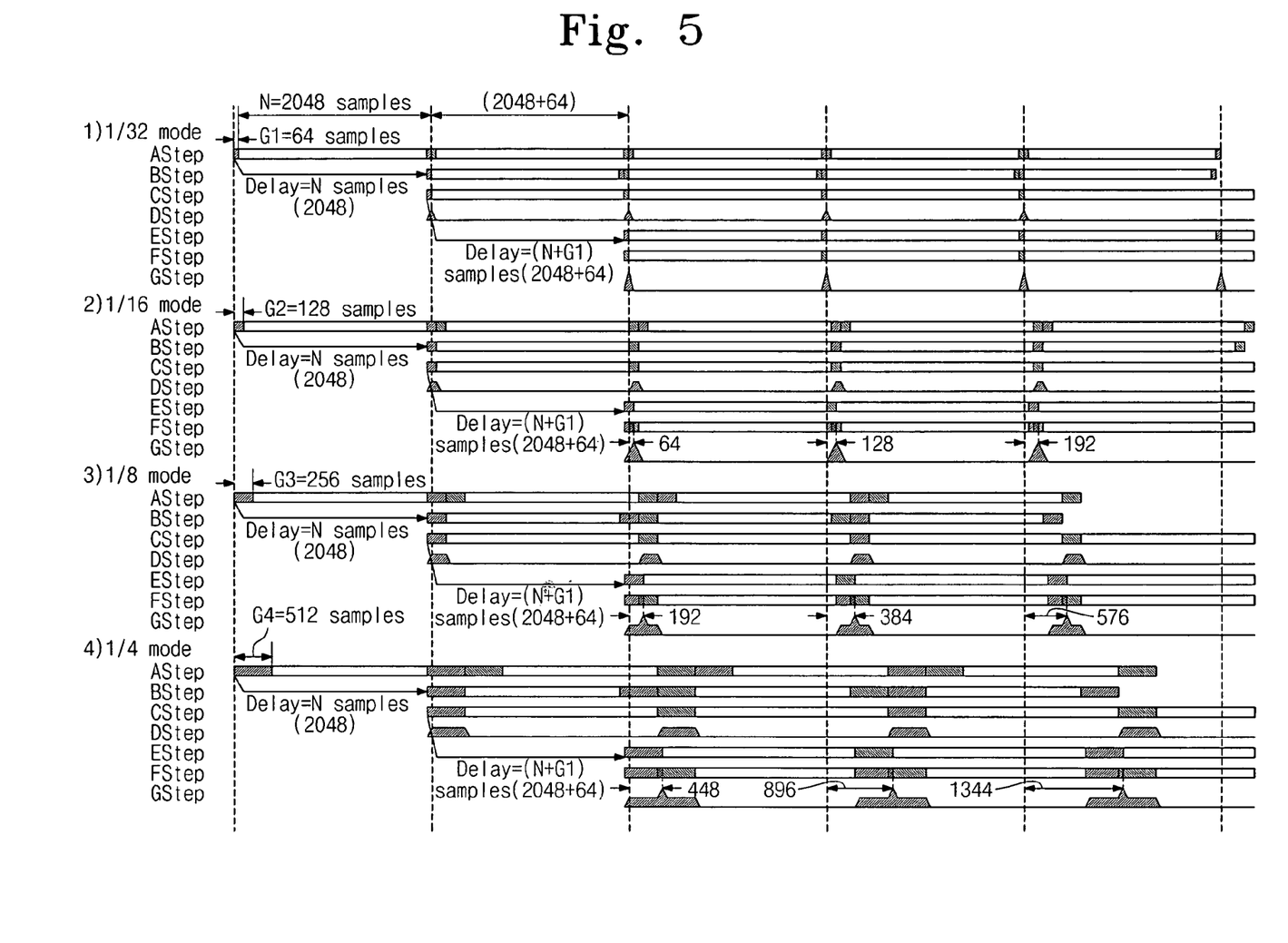
FIG. 5 is a timing diagram illustrating signal flow and operation of the circuits shown in FIGS. 3 and 4.

FIG. 5 is a timing diagram illustrating sequential steps of a method of processing received input signals and the method of operation of the circuits shown in FIGS. 3 and 4, for 4 types of guard interval (1) 1/32, 2) 1/16, 3) 1/8, 4) 1/4.

Referring to FIG. 5, the method of processing signals is performed by way of the sequential steps A(AStep), B(BStep), C(CStep), D(DStep), E(EStep), F(FStep), and G(GStep), wherein:

Step A represents a received sample train; Step B represents a sample train delayed from the sample train of the step B by the useful data duration of N samples; Step C represents complex a sample train as the result of correlation calculation with the sample train of the steps A and B and sliding addition; Step D shows a signal form of the absolute value for the complex sample train produced in step C; Step E represents a complex sample train (a delayed copy of the complex sample train of the step C, delayed by the interval N+G1 that corresponds to a sum of the useful data duration and the minimum guard interval); Step F represents the sample train resulting from a second correlation calculation with the complex sample train of the step C and the (delayed) complex sample train of the step E (delayed version of the sample trains of the step C,); and Step G represents distribution of the real-number power data obtained from evaluation of the power of the resultant sample train of the correlation calculation by the step F.

As illustrated in FIG. 5, it can be seen that the result of the correlation calculation depends upon the mode of the guard intervals. For the various types of the guard intervals, (i.e., 1/32, 1/16, 1/8, and 1/4 modes), the step D represents the distribution profile of peaks when performing the first correlation calculation. And, the peak distribution after the second correlation calculation is shown in the step G for the various types of the guard intervals. The magnitude of peak appearing in the (guard interval) detection period N+G1 after the received sample train passes through the circuits of the FIG. 3 is configured with a distinct topological pattern as shown in the step D. The conventional peak pattern in the step D has been insufficient to be detected because the peaks are configured flat in the 1/32 mode. However, as the pattern of the sample train after the two correlation calculation processes has a more distinct (e.g., pointed) peak value, this distinction makes the detection more precise and easy. This feature of the embodiment of the invention is helpful for improving the performance of estimating the guard interval because detecting the guard interval through the two steps of correlation calculation greatly reduces the effects of noises and distortions.

The numbers shown in FIG. 5 represent dimensions such as detection periods, delay intervals, and the number of samples in the standard of the European digital broadcasting system. These data are summarized as indexed and shown in Table 1 as follows:

TABLE 1

| | Interval between peak and every periodic detection starting point (N + G1) | | | | |
|---|---|---|---|---|---|
| Guard interval type | Symbol period 1 | Symbol period 2 | Symbol period 3 | Symbol period 4 | Symbol period 5 |
| 1/32 mode (G1 = 64 samples) | 0 | 0 | 0 | 0 | 0 |
| 1/16 mode (G2 = 128 samples) | G1 (64) | 2G1 (128) | 3G1 (192) | 4G1 (256) | 5G1 (320) |
| 1/8 mode (G3 = 256 samples) | 3G1 (192) | 6G1 (384) | 9G1 (576) | 12G1 (768) | 15G1 (960) |
| 1/4 mode (G4 = 512 samples) | 7G1 (448) | 14G1 (896) | 21G1 (1344) | 28G1 (1792) | 35G1 (2240) |

The guard interval decider 360 (FIG. 3) determines the current type of the guard intervals by comparing the peak intervals, measured from peak detection (reference period N+G1) starting points, with reference to the expected time intervals stored in Table 1.

Thus, a method of the invention is comprised performing the first self-correlation (autocorrelation) calculation of the original OFDM sample train and a delayed OFDM sample train (delayed by one of the useful data duration (i.e., delayed one OFDM symbol, N), and then performing a second self-correlation (autocorrelation) calculation of the (regularized, averaged, filtered) first autocorrelation train and a first autocorrelation train delayed by one sample length (N). A step of regularizing (averaging) the result of the first self-correlation (autocorrelation) calculation may be performed before performing the second self-correlation (autocorrelation) calculation of the (regularized, averaged, filtered) first autocorrelation train and the (regularized, averaged, filtered) first autocorrelation train delayed by one sample length. And, the method detects the type of the current guard intervals based on calculating the time intervals between the peak energy of the second autocorrelation calculation, (e.g., by comparison with the detection starting points (and to a periodic reference interval having a period of N+G1). This improves the precision and reliability of timing synchronization. Performing the successive two steps of autocorrelation calculations provides an improvement of performance in detecting guard intervals for a OFDM receiver that effectively eliminates the influences of less correlative AWGN or distortions flowing into the system, and greatly increases the magnitude of the peak for detection, and generates the peak values to be easily detected rather than the conventional plane (flat-topped) results.

Although the present invention has been described in connection with the exemplary embodiments of the present invention illustrated in the accompanying drawings, it is not limited thereto. It will be apparent to those skilled in the art that various substitutions, modifications and changes may be thereto without departing from the scope and spirit of the invention.

According to the aforementioned description about the invention, the guard interval detection circuit of the OFDM receiver includes a signal processing procedure performing the two steps of (auto)correlation calculations for a received sample train, which enables obtaining a more correct result. Performing two steps of correlation calculations improves the performance of the OFDM system by correctly detecting guard intervals for the system and effectively blocking the influence of less correlative AWGN or distortions flowing into the system and providing a more distinct peak pattern.

What is claimed is:

1. A guard interval detection circuit of an orthogonal frequency division multiplication (OFDM) system, comprising:
    a first autocorrelator configured to delay a received sample train by a first time and to calculate a first autocorrelation value between the received sample train and the delayed sample train;
    a second autocorrelator configured to delay the output of the first autocorrelation value output from the first autocorrelator by a second time and to calculate a second autocorrelation value between the output of the first autocorrelation value and the delayed first autocorrelation value; and
    a detector configured to find a maximum value of the output of the second autocorrelator and the position of the maximum value.

2. The guard interval detection circuit as set forth in claim 1, wherein the detector is configured to decide the type of the guard interval based upon maximum values of the output of the second autocorrelator and the time positions of the maximum values.

3. The guard interval detection circuit as set forth in claim 1, wherein the first time is the useful data duration of the received sample train.

4. The guard interval detection circuit as set forth in claim 1, wherein the first time is the length of one OFDM symbol.

5. The guard interval detection circuit as set forth in claim 1, wherein the second time is the sum of the useful data duration of the received sample train plus the minimum guard interval length.

6. The guard interval detection circuit as set forth in claim 1, wherein the second time is the sum of the length of one OFDM symbol plus the minimum guard interval length.

7. The guard interval detection circuit as set forth in claim 1, wherein the first autocorrelator comprises:
- a delay circuit configured to delay the received sample train by the first time;
- a complex conjugator configured to convert the output of the delay circuit into its complex conjugate;
- a multiplier configured to perform complex multiplication of the received sample train and the delayed complex conjugate of the received sample train;
- a sliding adder configured to perform sliding addition of the output of the multiplier, within a window having the data width of the minimum guard interval length.

8. The guard interval detection circuit as set forth in claim 1, further comprising a regularizer and a multiplier configured to regularize the output of the first autocorrelator.

9. The guard interval detection circuit as set forth in claim 1, further comprising an Additive White Gaussian Noise (AWGN) filter.

10. The guard interval detection circuit as set forth in claim 1, wherein the first autocorrelator further comprises a regularizer and a mixer configured to regularize the output of the sliding adder.

11. The guard interval detection circuit as set forth in claim 1, wherein the first autocorrelator further comprises an Additive White Gaussian Noise (AWGN) filter.

12. The guard interval detection circuit as set forth in claim 1, wherein the second autocorrelator comprises:
- a delay circuit configured to delay the output of the first autocorrelator by the second time;
- a complex conjugator configured to convert the output of the delay circuit into its complex conjugate;
- a multiplier configured to perform complex multiplication with the output of the first autocorrelator and the delayed complex conjugate signal output from the complex conjugator; and
- a sliding adder configured to accumulate the output of the multiplier within a window having the width of the minimum guard interval length.

13. The guard interval detection circuit as set forth in claim 1, wherein the detector comprises:
- means configured to detect the maximum values of the output of the second autocorrelator within a window having the width of the guard interval detection period; and
- means configured to calculate the intervals between the maximum values; and
- means configured to decide the current type of the guard interval based on differential values of the intervals.

14. The guard interval detection circuit as set forth in claim 1, wherein the detector comprises:
- a circuit configured to detect the maximum values from the output of the second autocorrelator within a window having the width of the guard interval; and
- a circuit configured to calculate the intervals between the maximum values; and
- a circuit configured to decide the type of the guard interval based on differential values of the intervals.

15. The guard interval detection circuit as set forth in claim 14, wherein the guard interval detection period is a sum of the minimum guard interval and the useful data duration of the received sample train.

16. A method of detecting a guard interval in an orthogonal frequency division system comprising:
- performing a first correlation calculation upon an input sample train and the input sample train delayed by useful data duration;
- performing a second correlation calculation upon the result of the first autocorrelation step and the result of the first autocorrelation step delayed by the sum of the useful data duration plus the minimum length of the guard interval;
- detecting and storing positions of the maximum values resulting from the second correlation calculation; and
- deciding the length of the guard interval based on calculating differential values of intervals between the maximum values.

17. A method of detecting a guard interval in an orthogonal frequency division system comprising:
- performing a first autocorrelation calculation upon an input sample train and the input sample train delayed by a first time;
- performing a second autocorrelation calculation upon the result of the first autocorrelation calculation and the result of the first autocorrelation calculation delayed by a second time;
- detecting positions of the maximum values of the power of the signal resulting from the second autocorrelation calculation; and
- deciding the length of the guard interval based on the intervals between the maximum values.

18. The method of claim 17, wherein the second time is longer than the first time.

19. The method of claim 17, wherein the first time is the length of an OFDM symbol.

20. The method of claim 19, wherein the second time is the sum of the length of one OFDM symbol plus the minimum length of the guard interval.

21. The method of claim 17, wherein the second time is the sum of the useful data duration plus the minimum length of the guard interval.

22. The method of claim 17, wherein performing the first autocorrelation calculation includes performing as first sliding addition within a window having the width of the minimum guard interval length.

23. The method of claim 17, wherein performing the second autocorrelation calculation includes performing a second sliding addition within a window having the width of the minimum guard interval length.

24. The method of claim 17, further comprising performing regularization of the result of the first autocorrelation calculation and then performing the second autocorrelation calculation.

25. The method of claim 24, wherein performing the second autocorrelation calculation includes performing the second autocorrelation calculation upon a regularized result of the first autocorrelation calculation and the regularized result of the first autocorrelation calculation delayed by a second time.

* * * * *